C. KRÄMER.
TRANSPORTING APPARATUS.
APPLICATION FILED APR. 16, 1908.
907,819.
Patented Dec. 29, 1908.
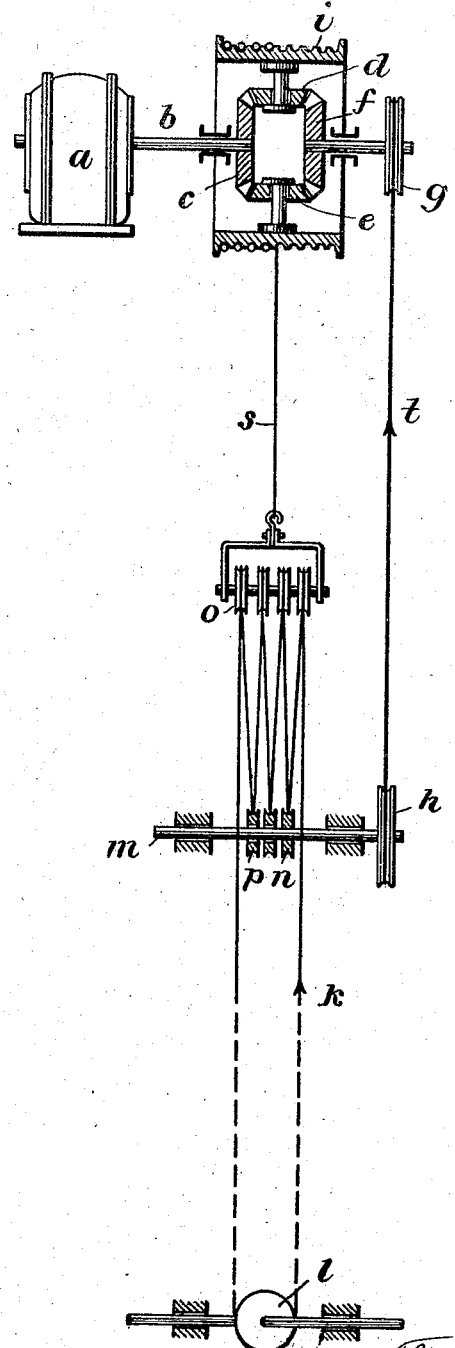

UNITED STATES PATENT OFFICE.

CHRISTIAN KRÄMER, OF FRANKFORT-ON-THE-MAIN, GERMANY, ASSIGNOR TO THE FIRM OF FELTEN & GUILLEAUME-LAHMEYERWERKE AKTIEN-GESELLSCHAFT, OF FRANKFORT-ON-THE-MAIN, GERMANY.

TRANSPORTING APPARATUS.

No. 907,819.  Specification of Letters Patent.  Patented Dec. 29, 1908.

Application filed April 16, 1908. Serial No. 427,508.

*To all whom it may concern:*

Be it known that I, CHRISTIAN KRÄMER, a subject of the German Emperor, and a resident of Frankfort-on-the-Main, Germany, have invented certain new and useful Improvements in or Relating to Transporting Apparatus, of which the following is a specification.

My invention relates to a device for transporting articles, such as large quantities of goods, between points which alter their distance apart, without the transport being affected by such alteration. For instance, such devices could be used for transshipping cargo from one ship to another, or to land, or vice versa. The transport is generally effected by a cable which is stretched between the two movable points, and the length of the cable must be altered in accordance with the alterations which take place in the distance, in order to insure a constant tension of the cable and constant speed of conveying.

According to my invention, the tightening of the cable to suit the change in the distance is effected in a very simple manner compared with existing constructions.

According to my invention, the driving motor, for instance a normal electric motor, preferably a series motor, drives one element of a differential gear (which could be replaced by a planet gear) while the second element is used for driving the transport cable and the third element for tightening the cable.

A construction according to this invention is illustrated, by way of example, in the accompanying drawing.

The normal motor $a$ drives for instance by means of a spindle $b$ a toothed wheel $c$. The said toothed wheel $c$ engages with the central wheels $d$ and $e$ of a differential gear which in their turn again drive the toothed wheel $f$ and are themselves connected with the inner face of a cable drum $i$. This cable drum $i$ serves for tightening the transport cable $k$ passing over a pulley $l$ arranged at the second station and carrying from one station to the other goods or the like secured to the traveling cable $k$. The toothed wheel $f$ drives a pulley $g$ over which a cable $t$ or the like leads to the pulley $h$ arranged at a fixed distance from the pulley $g$. The pulley $h$ drives in its turn the spindle $m$ and the pulley $n$ secured to the latter, whereby the transport cable $k$ is driven and travels over the pulleys $o$ and $p$ of a pulley block. The pulley $o$ of the said pulley block are mounted in a bracket or sheave $r$ secured to a cable $s$ secured to the drum $i$. If for instance owing to the two ships getting nearer to each other, the slack of the cable $k$ becomes greater and therefore the tension smaller, the force required for driving the cable will first become smaller, that is to say the pulley $l$ will be relieved of a portion of its load. The result of this will be that the drum $i$ will be rotated until the original tension of the cable has been reestablished, that is to say until there is again a state of equilibrium in the system. The movement of the drum $i$ will be the quicker, the greater the portion of the cable to be wound up, so that the device according to my invention acts in such a way as to bring about as quickly as possible the reëstablishment of the normal working state which is fixed by the ratio of transmission in the differential gear etc. If, on the other hand, the two stations move away from each other, then, as will be clearly seen from the drawing, the drum $i$ will deliver as much cable as required by the increase of the distance between the two stations. In each case, the speed transmitted to the transport cable $k$ by means of the cable $t$, will however remain practically constant.

By means of my invention it is therefore possible to insure with the assistance of a normal motor and of a differential gear, a continuous automatic regulation of a constant tension of the cable and of a constant speed of transport. It must also be pointed out that the single driving elements of the differential gear could be exchanged for each other in any desired manner, since each of the elements could be used for tightening the cable or for transporting or for driving the motor. It is also possible, and in some cases advisable, to regulate the tension of the cable by additional braking forces which are allowed to act on the cable.

I claim:

1. The combination with an endless conveyer extending between two points, the distance separating which is subject to frequent variation while the conveyer is in operation, of a motor, means connecting the motor and conveyer for driving the latter, and means actuated by the motor for maintaining the tension of the conveyer uniform as the distance between said points changes.

2. The combination with an endless conveyer extending between two points, the distance separating which is subject to frequent variation while the conveyer is in operation, of a motor, a gear adapted to be rotated by the motor, means for transmitting power from said gear to the conveyer, a drum connected by gearing with said gear, and a cable connecting said drum with one of the supports of the conveyer, whereby the tension of the latter will be maintained uniform regardless of variation in the distance separating said points.

3. The combination with an endless conveyer extending between two points, the distance separating which is subject to frequent variation while the conveyer is in operation, of a motor, a gear adapted to be rotated by the motor, means for transmitting power from said gear to the conveyer, a drum surrounding and geared with said gear, and a cable connecting said drum with one of the supports of the conveyer, whereby the tension of the latter will be maintained uniform regardless of variation in the distance separating said points.

4. The combination with an endless conveyer extending between two points, the distance separating which is subject to frequent variation while the conveyer is in operation, a motor, a drum surrounding and connected with one member of a differential gear, connections between said differential gear and a motor, and a cable connecting said drum with one of the supports of the conveyer, whereby the tension of the latter will not be affected by variations in the distance separating said points.

In testimony whereof I have signed my name to this specification in the presence of two subscribing witnesses.

CHRISTIAN KRÄMER.

Witnesses:
  ERWIN DIPPEL,
  MICHAEL VOLK.